United States Patent
Smith et al.

(10) Patent No.: US 12,365,248 B2
(45) Date of Patent: Jul. 22, 2025

(54) CONTROL SYSTEM FOR REGULATING HARMONIC TORQUE DISTURBANCES IN AN ELECTRIC VEHICLE

(71) Applicant: BorgWarner Inc., Auburn Hills, MI (US)

(72) Inventors: James Smith, Washington Crossing, PA (US); Hassan H. Eldeeb, Carmel, IN (US); Caleb W. Secrest, Noblesville, IN (US); Siddharth Ballal, Fishers, IN (US)

(73) Assignee: BorgWarner Inc., Auburn Hills, MI (US)

( * ) Notice: Subject to any disclaimer, the term of this patent is extended or adjusted under 35 U.S.C. 154(b) by 212 days.

(21) Appl. No.: 18/211,776

(22) Filed: Jun. 20, 2023

(65) Prior Publication Data
US 2024/0424906 A1    Dec. 26, 2024

(51) Int. Cl.
*B60L 3/00* (2019.01)
(52) U.S. Cl.
CPC ....... *B60L 3/0061* (2013.01); *B60L 2240/423* (2013.01)
(58) Field of Classification Search
CPC ............. B60L 3/0061; B60L 2240/423; B60L 2240/421; B60L 15/20
See application file for complete search history.

(56) References Cited

U.S. PATENT DOCUMENTS

| 5,359,269 | A | * | 10/1994 | Wedeen | ................. | G05D 17/02 |
| | | | | | | 318/432 |
| 2018/0097461 | A1 | * | 4/2018 | Ballal | ..................... | H02P 21/22 |
| 2022/0131490 | A1 | * | 4/2022 | Peddi | ........................ | H02P 6/10 |
| 2023/0286392 | A1 | * | 9/2023 | Sawada | .................... | B60L 3/102 |

FOREIGN PATENT DOCUMENTS

| JP | 2016187249 | A | * | 10/2016 | | |
| KR | 20170075825 | A | * | 7/2017 | | |
| WO | WO-2023032012 | A1 | * | 3/2023 | ............. | B60L 15/20 |

OTHER PUBLICATIONS

Mohanraj et al.; Critical Aspects of Electric Motor Drive Controllers and Mitigation of Torque Ripple-Review; IEEE Access; Digital Object Identifier 10.1109/Access.2022.3187515; vol. 10, 2022; Jul. 2022; pp. 73635-73674 (Year: 2022).*

Zhu et al.; Torque-Ripple-Based Interior Permanent-Magnet Synchronous Machine Rotor Demagnetization Fault Detection and Current Regulation; IEEE Transactions on Industry Applications, vol. 53, No. 3, May/Jun. 2017; pp. 2795-2804 (Year: 2017).*

(Continued)

*Primary Examiner* — Michael J Zanelli
(74) *Attorney, Agent, or Firm* — Reising Ethington P.C.

(57) ABSTRACT

A control system for generating a torque command for an electric motor carried by an electric vehicle (EV) including a motion observer configured to receive an angular position of an output shaft of the electric motor and an ideal torque command and output an estimated disturbance torque value; and a controller configured to receive the estimated disturbance torque value as well as output a harmonic disturbance torque value.

10 Claims, 3 Drawing Sheets

(56) References Cited

OTHER PUBLICATIONS

Sho Nakata, Nobukazu Hoshi and Takashi Yamaguchi, A Novel Suppression method of 6th-order torque ripple of Permanent Magnet Synchronous Motor without Torque Meter, 2015 18th International Conference on Electrical Machines and Systems (ICEMS), Oct. 25-28, 2015 (7 pages).

Hao Chen, Huawu Liu, Yan Xing and Haibing Hu, Enhanced DFT-Based Controller for Selective Harmonic Compensation in Active Power Filters, IEEE Transactions on Power Electronics, vol. 34, No. 8, Aug. 2019 (14 pages).

R. Punchalard, J. Koseeyaporn and P. Wardkein, Inverse Tangent Based Adaptive IIR Notch Filter, IEEE, 2006 (4 pages).

Luocheng Yan, Yong Liao, Hao Lin, and Jun Sun, Torque ripple suppression of permanent magnet synchronous machines by minimal harmonic current injection, IET Power Electronics, Jul. 5, 2018 (9 pages).

\* cited by examiner

CONTROL SYSTEM FOR REGULATING HARMONIC TORQUE DISTURBANCES IN AN ELECTRIC VEHICLE

TECHNICAL FIELD

The present application relates to vehicular control systems and, more particularly, to control systems used with electric vehicles (EVs) and hybrid electric vehicles (HEVs).

BACKGROUND

Modern vehicles increasingly rely on electric motors for all or at least some vehicle propulsion. Electric vehicles (EVs) typically include a vehicle battery, an electric motor (sometimes referred to as an electric machine), and a control system that selectively supplies electrical energy stored in the vehicle battery to the electric motor. The regulation and control of electrical energy supplied to the electric motor involves a number of challenges so as to ensure smooth and reliable operation. During some operating conditions, a torque ripple or oscillation can exist at an output shaft of the electric motor. It would be helpful to mitigate the torque ripple thereby decreasing noise, vibration, and/or harshness experienced by vehicle occupants.

SUMMARY

In one implementation, a control system for generating a torque command for an electric motor carried by an electric vehicle (EV) including a motion observer configured to receive an angular position of an output shaft of the electric motor and an ideal torque command and output an estimated disturbance torque value; and a controller configured to receive the estimated disturbance torque value as well as output a harmonic disturbance torque value.

In another implementation, a control system for generating a torque command for an electric motor carried by an EV, including a motion observer configured to: receive an estimated angular position of an output shaft of the electric motor; receive a measured angular position of the output shaft; receive an ideal torque command; subtract the measured angular position from the estimated angular position; output an estimated disturbance torque value; generate an estimated angular acceleration using the estimated disturbance torque value and an ideal torque command; generate an estimated angular velocity based on the estimated angular acceleration; and a controller configured to: receive the estimated disturbance torque value; receive the estimated angular velocity; and output a harmonic disturbance torque value.

DETAILED DESCRIPTION

A torque ripple mitigation controller can estimate and compensate for an $h^{th}$ order harmonic existing in an electromagnetic torque of an electric motor (also called an electric machine) used by a vehicle for at least some propulsion. The electric motor can be an interior permanent magnet synchronous machine (IPMSM) traction system. The torque ripple mitigation controller that estimates and compensates for the $h^{th}$ order harmonic can be implemented in different ways. The following will be described with respect to a 6th order harmonic, but the described controller/control system can be used with other harmonics as well. For instance, the torque ripple mitigation controller can include a harmonic order filter, such that it is harmonic-based. Or in another implementation, the torque ripple mitigation controller can include an inverse notch filter. The torque produced by an output of an electric motor can include torque ripple. A harmonic torque command ($\widetilde{T}_h$) can be superimposed onto a torque command ($T_{cmd}$) to eliminate the torque ripple from the physical torqued produced by the electric motor. In one implementation, an enhanced Luenberger Observer (ELO) can be included in the control system.

Figure 1:
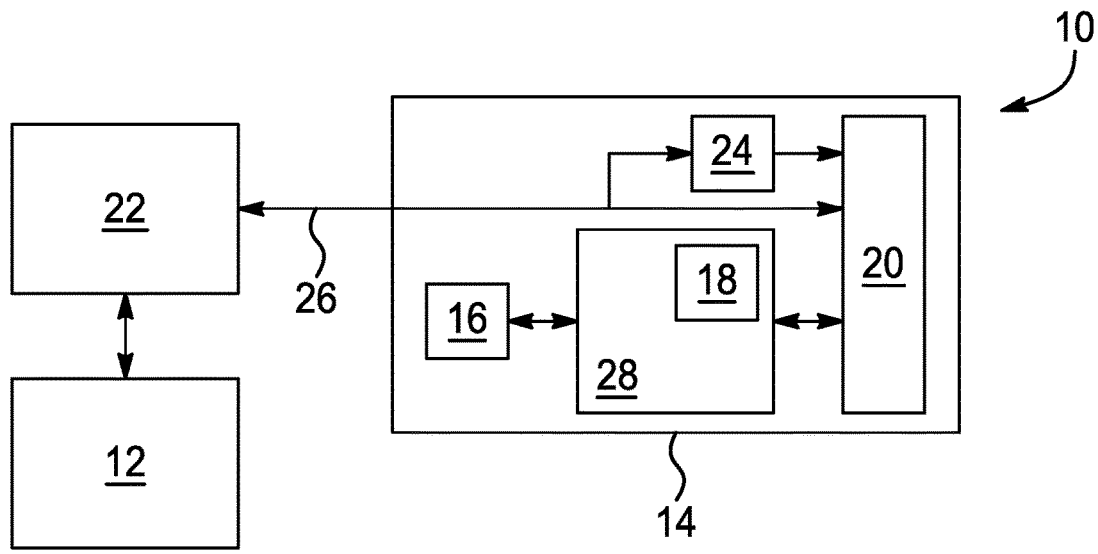
FIG. 1 is a block diagram depicting an implementation of an electric vehicle (EV)

Turning to FIG. 1, an implementation of an electrical system 10 is shown including an electrical grid 12 and an electric vehicle (EV) 14 that can either receive electrical power from or provide electrical power to the grid 12. The electrical grid 12 can include any one of a number of electrical power generators and electrical delivery mechanisms. Electrical generators (not shown) create AC electrical power that can then be transmitted a significant distance away from the electrical generator for residential and commercial use. The electrical generator can couple with the electrical grid 12 that transmits the AC electrical power from the electrical generator to an end user, such as a residence or business. As the AC electrical power is provided to the electrical grid 12, the electrical power can exist at a relatively high voltage so that it can be transmitted relatively long distances. Once the electrical power reaches a location where it is intended to be used, electrical transformers (not shown) can be used to reduce the voltage level before ultimately being provided to a residence or business. In one implementation, the voltage level of AC electrical power used is 360-510 volts RMS alternating current three-phase, 50-60 hz. However, this voltage range can be different.

The EV 14 can include an electric motor 16 that wholly, or at least partially, propels the vehicle. In the described implementation, the electric motor 16 is an IPMSM, but other implementations are possible using the controller and functionality described herein. A three-phase power inverter 18 can be electrically coupled to an EV battery 20 and the electric motor 16. The power inverter can receive DC electrical power from the EV battery 20 and invert the DC electrical power into three-phase AC electrical power before supplying the AC electrical power to the electric motor 16. The amount of voltage supplied by the EV battery to the electric motor can vary by application. The term "electric vehicle" or "EV" can refer to vehicles that are propelled, either wholly or partially, by electric motors. EV can refer to electric vehicles, plug-in electric vehicles, hybrid-electric vehicles, and battery-powered vehicles.

An EV charging station, referred to here as a DC fast charger 22, can receive AC electrical power from the grid 12, rectify the AC electrical voltage into DC electrical power, and provide the DC electrical power to the EV 14. The DC fast charger 22 can be geographically fixed, such as a charging station located in a vehicle garage or in a vehicle parking lot. The DC fast charger 22 can include an input terminal that receives the AC electrical power from the grid 12 and communicates the AC electrical power to the EV battery 20 directly, bypassing an on-board vehicle battery charger 24 included on the EV 14. An electrical cable 26 can detachably connect with an electrical receptacle on the EV 14 and electrically link the DC fast charger 22 with the EV 14 so that DC electrical power can be communicated between the DC fast charger 22 and the EV battery 20. One type of DC fast charging may be referred to as Level 3 EV charging, considered to be 60-350 kW. However, other charging standards and power levels are possible with the structure and functionality disclosed here. The EV battery 20 can supply DC electrical power controlled by power electronics to the electric motor 16 that propels the EV 14. The EV battery 20 or batteries are rechargeable. Examples of the battery include lead-acid batteries, nickel cadmium (NiCd), nickel metal hydride, lithium-ion, and lithium polymer batteries. However, battery technology is evolving and other chemistries and/or voltages may be used. A typical range of vehicle battery voltages can range from 100 to 1000V of DC electrical power (VDC). A control system 28, also called a torque ripple mitigation controller, implemented as computer-readable instructions executable by the microprocessor, can be stored in non-volatile memory and called on to monitor vehicle sensors and generate control signals that include a torque command for the electric motor 16 of the EV 14. This will be discussed in more detail below.

Figure 2:
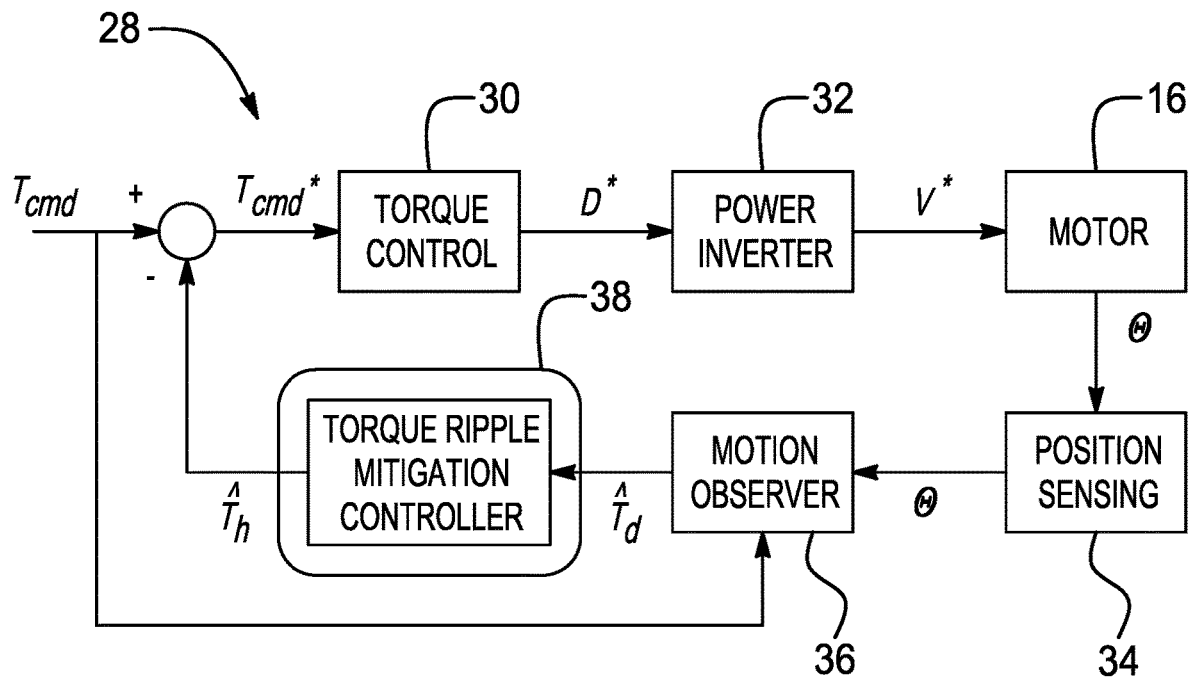
FIG. 2 is a block diagram depicting an implementation of a control system that estimates and compensates for an $h^{th}$ order harmonic existing in an electromagnetic torque of an electric machine.

Turning to FIG. 2, an implementation of the control system 28, or torque ripple mitigation controller, capable of estimating and compensating for an $h^{th}$ order harmonic existing in electromagnetic torque of the electric motor 16 used by the EV 14. The control system 28 includes a torque control block 30, a power inverter 32, a position sensing block 34, a motion observer 36, and a torque ripple mitigation controller 38. The vehicle control system 28 can generate a compensated torque command ($T_{cmd}$*) that is received by the torque control block 30. To generate the compensated torque command ($T_{cmd}$*), the vehicle control system 28 can receive an ideal torque command ($T_{cmd}$) that is unmodified and smooth. The vehicle control system 28 can determine a harmonic torque portion ($\widehat{T}_h$) of the electromagnetic torque produced by the electric motor 16 and remove or otherwise subtract it from the ideal torque command ($T_{cmd}$) to produce the compensated torque command ($T_{cmd}$*). Based on the duty cycle reference values (D*) communicated to the power inverter 32, it generates a three-phase voltage command (V*$_{abc}$) that is received by the electric machine 16.

Generally speaking, the torque control block 30 can generate a voltage command that acts to remove the harmonic disturbance torque to generate duty cycle commands (D*) that are communicated to the power inverter 32. The power inverter 32 can be coupled to the EV battery 20 and include power control electronics that converts DC electrical power to AC electrical power. In some implementations the power inverter 32 can include a DC-DC converter as well. The power inverter 32 can generate three-phase voltage commands to induce angular movement of a rotor of the electric motor 16 relative to a stator. The position sensing block 34 can include a sensor that monitors the angular position (θ) of an output shaft of the electric motor 16 over time. The angular position can be supplied to the motion observer 36 that can determine an estimated disturbance torque ($\widehat{T}_d$) at the output shaft to the electric motor 16 using the $T_{cmd}$.

Figure 3:
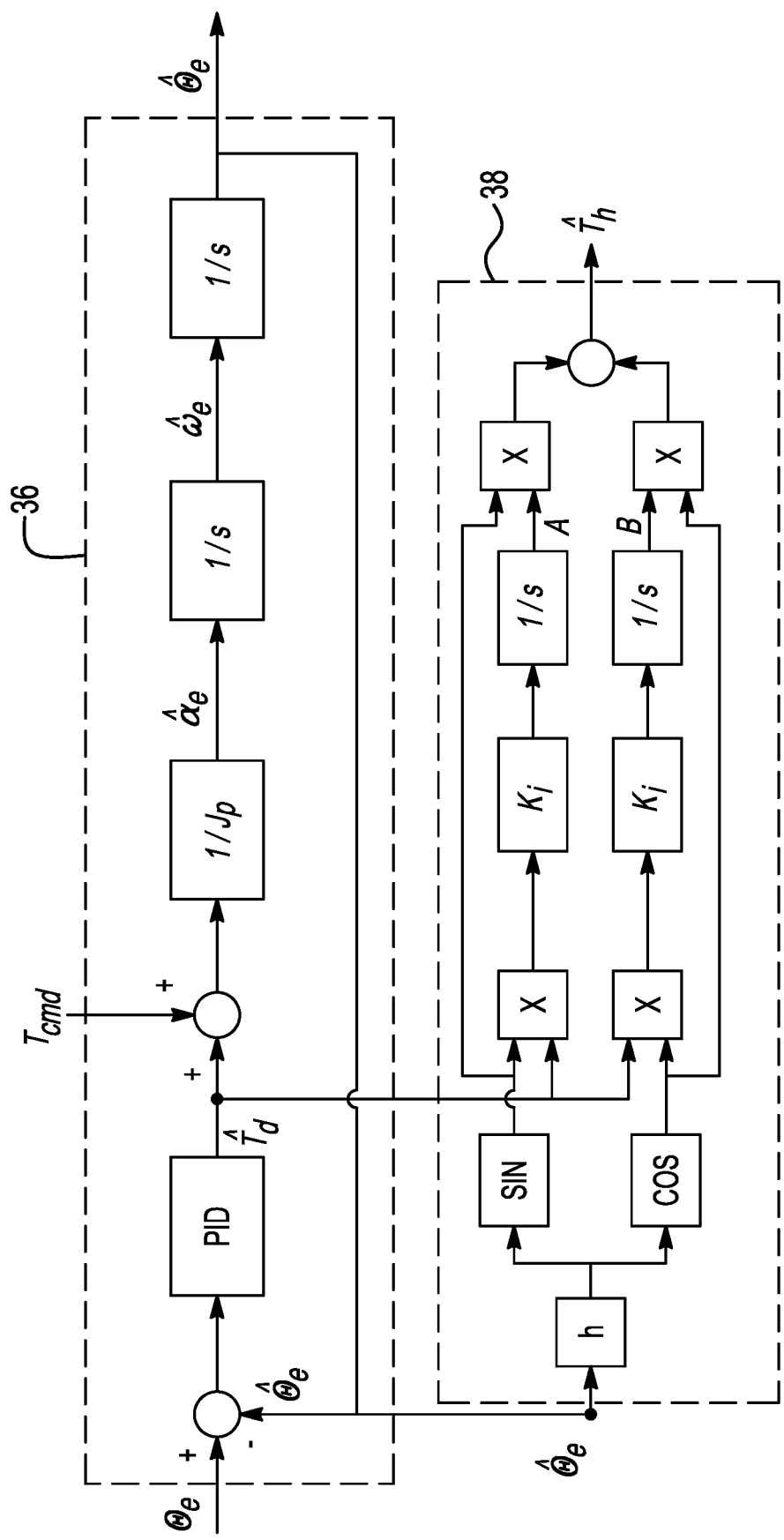
FIG. 3 is a block diagram depicting a portion of an implementation of a control system that estimates and compensates for an $h^{th}$ order harmonic existing in an electromagnetic torque of an electric machine.

The torque ripple mitigation controller 38 can receive the estimated disturbance torque ($\widehat{T}_d$) and determine the harmonic torque portion ($\widehat{T}_h$) of the electromagnetic torque produced by the electric motor 16. One implementation of the motion observer 36 and the torque ripple mitigation controller 38 is shown in FIG. 3. The torque ripple mitigation controller 38 can be implemented as a harmonic order filter-based controller. Fourier series decomposition of the $h^{th}$ order can be used to extract the harmonic torque content. The motion observer 36 can receive the angular position ($θ_e$) of the output shaft of the electric motor 16 and generate an estimated angular position ($\widehat{θ_e}$) of the output shaft. The difference between the received angular position ($θ_e$) and the estimated angular position ($\hat{θ}_e$) can be provided to a PID controller in block 36 to generate an estimated disturbance torque value ($\widehat{T}_d$). A transfer function that uses the inertia ($J_p$) of the electric motor 16 can be applied to the sum of the output from the PID controller and the ideal torque command ($T_{cmd}$) thereby creating an estimated angular acceleration ($\widehat{α_e}$). The estimated disturbance torque value ($\widehat{T}_d$) can also be supplied to the torque ripple mitigation controller 38. Another transfer function having a Laplace operator (s) can be applied to the estimated angular acceleration ($\widehat{α_e}$) to obtain an estimated angular velocity ($\widehat{ω}_e$). The estimated angular velocity ($\widehat{ω}_e$) can be supplied to another transfer function having a Laplace operator(s) to obtain the estimated angular position (De).

The estimated angular position ($\hat{θ}_e$) is provided to the torque ripple mitigation controller 38. The controller 38 can be set with the harmonic order compensated for (h). The estimated angular position ($\hat{θ}_e$) can be multiplied by the harmonic order (h) and the result input into sine and cosine operators. The outputs of the sine and cosine operators can then be multiplied by the estimated disturbance torque ($\widehat{T}_d$) and a gain ($K_i$). The outputs from the gain blocks can then be acted on by Laplace operators/transfer functions to obtain Fourier coefficient terms A and B. The A and B coefficients can then be then multiplied by the sine and cosine of the estimated angular position ($\hat{θ}_e$), respectively, and the results can be summed to ultimately transform them into in an estimated harmonic torque ($\widehat{T}_h$) of the $h^{th}$ harmonic order.

Figure 4:
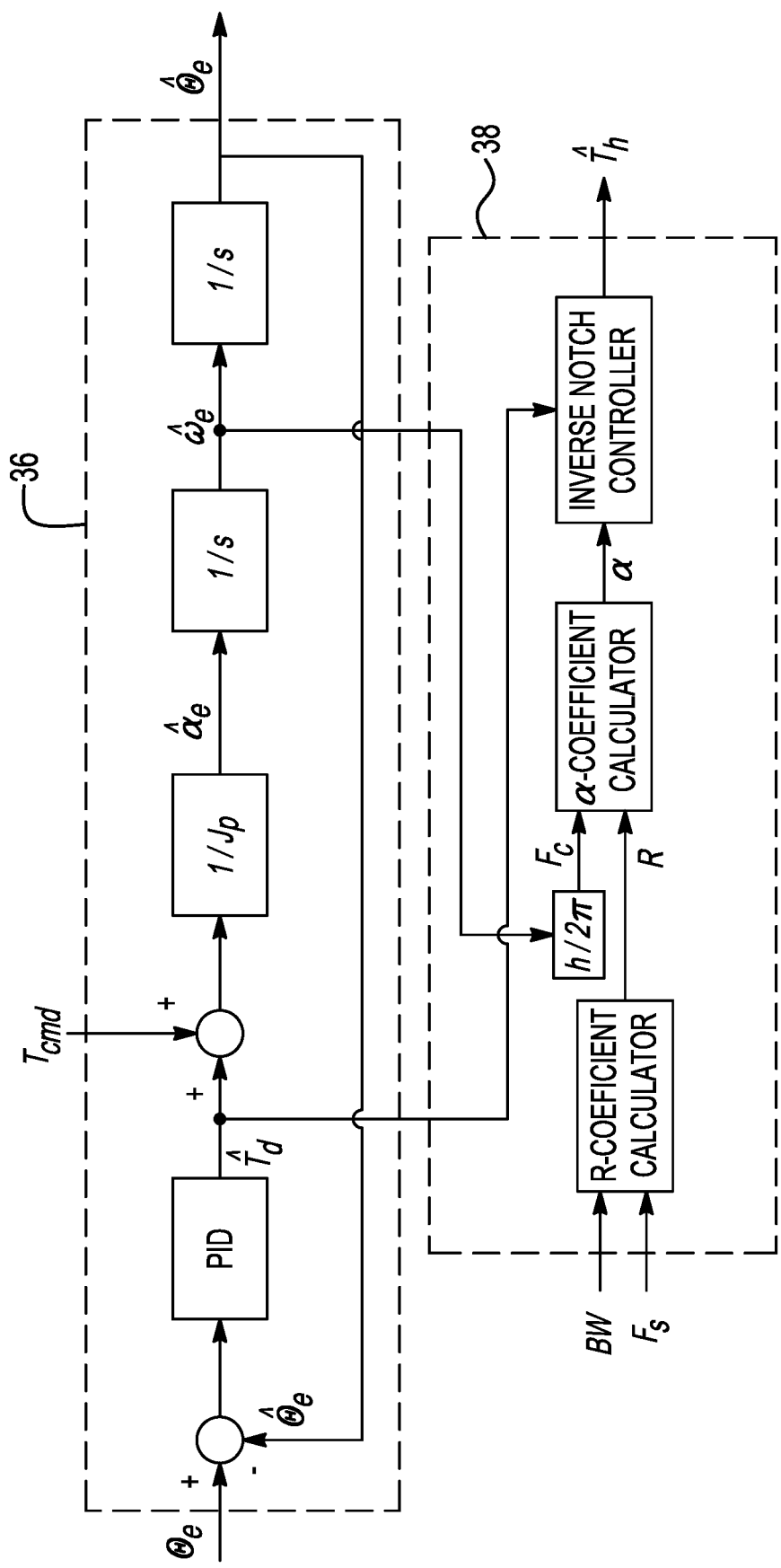
FIG. 4 is a block diagram depicting a portion of another implementation of a control system that estimates and compensates for an $h^{th}$ order harmonic existing in an electromagnetic torque of an electric machine.

Another implementation of the torque ripple mitigation controller 38' is shown in FIG. 4. The controller 38' can be implemented using an inverse-notch-filter-based controller. The controller 38' receives a bandwidth (BW) value of an inverse notch filter, a switching frequency ($F_s$), an estimated torque disturbance ($T_d$), and an estimated angular velocity ($\widehat{ω}_e$). The bandwidth (BW) value and the switching frequency ($F_s$) can be provided to a first R-coefficient calculator block. The first R-coefficient calculator block can output an R-coefficient that can be provided to an α-coefficient calculator along with a notch frequency ($F_c$) determined from the estimated angular velocity ($\widehat{ω}_e$). The α-coefficient calculator can output an α-coefficient (α), which can then be provided to the inverse notch filter-based controller block. The output from the inverse notch filter-based controller block is the harmonic torque ($\widehat{T}_h$) of the $h^{th}$ harmonic order.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A control system for generating a torque command for an electric motor carried by an electric vehicle (EV), comprising:
    a motion observer configured to receive an angular position of an output shaft of the electric motor and an ideal torque command and output an estimated disturbance torque value;
    a controller configured to receive the estimated disturbance torque value as well as output a harmonic disturbance torque value; and
    a torque command block that generates a torque command with an additional harmonic torque that eliminates the harmonic disturbance torque produced by the electric motor.

2. The control system recited in claim 1, wherein the controller includes a harmonic order filter-based controller.

3. The control system recited in claim 1, wherein the controller includes an inverse notch filter-based controller.

4. The control system recited in claim 1, further comprising a sensor that detects the actual angular position of the output shaft of the electric motor.

5. The control system recited in claim 1, wherein the electric motor is a interior permanent magnet synchronous machine.

6. A control system for generating a torque command for an electric motor carried by an electric vehicle (EV), comprising:
    a motion observer configured to:
        generate an estimated angular position of an output shaft of the electric motor;
        receive a measured angular position of the output shaft;
        receive an ideal torque command;
        subtract the measured angular position from the estimated angular position;
        output an estimated disturbance torque value;
        generate an estimated angular acceleration using the estimated disturbance torque value and an ideal torque command;
        generate an estimated angular velocity based on the estimated angular acceleration;
    a controller configured to:
        receive the estimated disturbance torque value;
        receive the estimated angular velocity; and
        output a harmonic disturbance torque value; and
    a torque command block that generates a torque command with an additional harmonic torque that eliminates the harmonic disturbance torque produced by the electric motor.

7. The control system recited in claim 6, wherein the controller includes a harmonic order filter-based controller.

8. The control system recited in claim 6, wherein the controller includes an inverse notch filter-based controller.

9. The control system recited in claim 6, further comprising a sensor that detects the actual angular position of the output shaft of the electric motor.

10. The control system recited in claim 6, wherein the electric motor is an interior permanent magnet synchronous machine.

* * * * *